(12) United States Patent
Jelken et al.

(10) Patent No.: US 12,259,055 B2
(45) Date of Patent: Mar. 25, 2025

(54) MODULAR VALVE ASSEMBLY

(71) Applicant: FISHER CONTROLS INTERNATIONAL LLC, Marshalltown, IA (US)

(72) Inventors: Shannon E. Jelken, Marshalltown, IA (US); Katherine N. Bartels, Ames, IA (US); Thomas N. Gabriel, Marshalltown, IA (US); Lawrence Martin, Marshalltown, IA (US); Julian A. Mann, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 212 days.

(21) Appl. No.: 17/828,809

(22) Filed: May 31, 2022

(65) Prior Publication Data

US 2023/0151902 A1    May 18, 2023

Related U.S. Application Data

(63) Continuation-in-part of application No. 17/527,392, filed on Nov. 16, 2021, now Pat. No. 12,044,319.

(51) Int. Cl.
*F16K 27/04* (2006.01)
*F16K 3/24* (2006.01)
*F16K 47/08* (2006.01)

(52) U.S. Cl.
CPC ........... *F16K 27/044* (2013.01); *F16K 3/246* (2013.01); *F16K 47/08* (2013.01); *Y10T 137/86791* (2015.04); *Y10T 137/87539* (2015.04)

(58) Field of Classification Search
CPC ...... F16K 27/044; F16K 27/041; F16K 27/04; F16K 3/246; F16K 3/24; F16K 47/08;
(Continued)

(56) References Cited

U.S. PATENT DOCUMENTS

| 219,625 A | 9/1879 | Dickey |
| 220,202 A | 9/1879 | Wilder |

(Continued)

OTHER PUBLICATIONS

Search Report for PCT/US2015/022873 (Year: 2015).*
Written Opinion for PCT/US2015/022873 (Year: 2015).*

*Primary Examiner* — Craig J Price
*Assistant Examiner* — Andrew J Rost
(74) *Attorney, Agent, or Firm* — MARSHALL, GERSTEIN & BORUN LLP

(57) ABSTRACT

A modular valve assembly includes a bonnetless main core, a first releasable connection, and a second releasable connection. A first inlet end connection includes a first inlet end flow passage. The first inlet end flow passage includes a curved portion that changes a direction of the first inlet end flow passage between 30 and 120 degrees. A second inlet end connection includes a second inlet end flow passage. The second inlet end connection passage is substantially straight. A first outlet end connection includes a first outlet end flow passage. The first outlet end flow passage includes an angled portion. A second outlet end connection passage includes a second outlet end flow passage. The first and second inlet end connections and the first and second outlet end connections are rapidly reconfigurable to form a variety of valve configurations.

18 Claims, 5 Drawing Sheets

(58) Field of Classification Search
CPC ......... F16K 11/0716; Y10T 137/87265; Y10T 137/87539; Y10T 137/86791; Y10T 137/86759
USPC ...................................................... 137/271
See application file for complete search history.

(56) References Cited

U.S. PATENT DOCUMENTS

| | | | |
|---|---|---|---|
| 251,035 A | 12/1881 | Freeman | |
| 324,762 A | 8/1885 | Fleischer et al. | |
| 384,883 A | 6/1888 | Williams | |
| 417,136 A | 12/1889 | Bell | |
| 424,199 A | 3/1890 | Haskell | |
| 609,386 A | 8/1898 | Dean | |
| 976,055 A | 11/1910 | Duham | |
| 1,567,183 A | 12/1925 | Conrader | |
| 1,586,418 A | 5/1926 | Frederiksen | |
| 1,813,222 A | 7/1931 | Barrett | |
| 1,840,564 A | 1/1932 | Brown | |
| 1,882,392 A | 10/1932 | Musgrave | |
| 2,001,534 A | 5/1935 | Hughes | |
| 2,014,968 A | 9/1935 | Hughes | |
| 2,336,653 A | 12/1943 | Taylor | |
| 2,392,741 A | 1/1946 | Hurlburt | |
| 2,425,439 A | 8/1947 | Puster | |
| 2,507,851 A * | 5/1950 | Bryant | F16K 1/06 251/142 |
| 2,717,005 A | 9/1955 | Bertram | |
| 2,720,892 A | 10/1955 | Mitchell | |
| 2,768,509 A | 10/1956 | Bateman | |
| 2,880,748 A | 4/1959 | Elsey | |
| 2,916,047 A | 12/1959 | Butcher | |
| 2,918,087 A | 12/1959 | Curran | |
| 2,925,824 A | 2/1960 | Rockwell | |
| 2,962,039 A | 11/1960 | Shand | |
| 2,963,261 A | 12/1960 | Holl | |
| 2,984,450 A | 5/1961 | Doe | |
| 2,993,507 A | 7/1961 | Daly | |
| 3,025,873 A | 3/1962 | Ray | |
| 3,035,608 A | 5/1962 | Ray | |
| 3,110,471 A * | 11/1963 | Kuhles | F16K 27/02 251/367 |
| 3,153,424 A | 10/1964 | Acker | |
| 3,193,250 A | 7/1965 | Good et al. | |
| 3,453,884 A | 7/1969 | Marx | |
| 3,545,465 A | 12/1970 | Zadoo | |
| 3,583,426 A | 6/1971 | Feres | |
| 3,646,969 A | 3/1972 | Stampfli | |
| 3,680,597 A | 8/1972 | Obermaier | |
| 3,720,234 A | 3/1973 | Gorgens et al. | |
| 3,779,275 A | 12/1973 | Ley | |
| 3,799,131 A | 3/1974 | Bolton | |
| 3,821,968 A | 7/1974 | Barb | |
| 3,836,116 A | 9/1974 | Noiles | |
| 3,884,268 A | 5/1975 | Wagner | |
| 4,210,166 A * | 7/1980 | Munie | B01F 25/4335 137/271 |
| 4,460,014 A | 7/1984 | Mases | |
| 4,479,670 A | 10/1984 | Gabler | |
| 4,505,292 A | 3/1985 | Osterode | |
| 4,572,239 A | 2/1986 | Koch | |
| 4,778,148 A | 10/1988 | Kruger | |
| 5,388,613 A | 2/1995 | Kruger | |
| 5,580,031 A | 12/1996 | Lorch | |
| 5,749,586 A * | 5/1998 | Abe | F16L 23/22 264/234 |
| 6,006,732 A | 12/1999 | Oleksiewicz | |
| 6,039,319 A * | 3/2000 | Coonce | F16L 23/22 277/318 |
| 6,058,956 A | 5/2000 | Baker, Jr. | |
| 6,073,969 A * | 6/2000 | Zimmerly | F16L 23/22 285/12 |
| 6,247,461 B1 | 6/2001 | Smith | |
| 6,279,552 B1 | 8/2001 | Okada | |
| 6,279,602 B1 * | 8/2001 | Bonnefous | F16K 1/446 137/315.27 |
| 6,286,550 B1 | 9/2001 | Yamaki | |
| 6,386,234 B2 | 5/2002 | Sontag | |
| 6,928,995 B1 | 8/2005 | Hrytzak | |
| 7,159,617 B2 * | 1/2007 | Erickson | F16K 39/022 251/282 |
| 7,373,951 B2 | 5/2008 | Gossett et al. | |
| 8,033,294 B2 | 10/2011 | Greif | |
| 8,403,003 B2 | 3/2013 | Micheel et al. | |
| 8,997,771 B2 | 4/2015 | Lee et al. | |
| 9,354,638 B2 | 5/2016 | Rebreanu et al. | |
| 9,410,630 B1 * | 8/2016 | Taylor | F16K 17/406 |
| 9,518,662 B2 | 12/2016 | Doran | |
| 9,587,764 B2 | 3/2017 | Juhnke et al. | |
| 9,678,514 B2 | 6/2017 | Rebreanu et al. | |
| 9,845,901 B2 | 12/2017 | McCormick et al. | |
| 11,649,903 B2 * | 5/2023 | Jelken | F16K 27/02 137/625.48 |
| 2006/0260692 A1 | 11/2006 | Pechtold | |
| 2009/0205729 A1 * | 8/2009 | Wears | F16K 11/044 251/121 |
| 2015/0013790 A1 * | 1/2015 | Hoff | F16K 3/246 137/553 |
| 2017/0211481 A1 * | 7/2017 | Denton | F16K 1/12 |

\* cited by examiner

US 12,259,055 B2

MODULAR VALVE ASSEMBLY

BACKGROUND

Field of the Disclosure

The disclosure relates generally to fluid control valves and more specifically to fluid control valve assemblies with modular and interchangeable components.

Related Technology

Pressure regulators and pressure regulating valves are used in myriad industrial and residential applications for controlling the downstream pressure of a fluid. For example, in chemical processing plants or oil refineries, pressure regulating valves are used to manipulate a flowing fluid to compensate for increases or decreases in demand, or other load disturbances, and thus keep the fluid pressure regulated. Similarly, pressure regulating valves may be used in plumbing fixtures to maintain a pre-determined pressure of fluid that automatically adjusts to variations in demand, such as anti-scald valves in showers or faucets. By controlling downstream pressure, pressure regulating valves compensate for variations in downstream demand. For example, as downstream demand increases, pressure regulating valves open to allow more fluid to flow through the pressure regulating valve, thus maintaining a relatively constant downstream pressure. On the other hand, as downstream demand decreases, pressure regulating valves close to reduce the amount of fluid flowing through the pressure regulating valve, again maintaining a relatively constant downstream pressure.

Generally, pressure regulating valves include a cast valve body that houses valve trim. The valve trim is held in the valve body by a bonnet that is attached to the valve body. Valve bodies are generally designed to accommodate a particular type of valve trim and/or a particular upstream and downstream flow configuration. If the valve trim or the downstream flow configuration needs to be changed, a new valve housing is required.

SUMMARY OF THE DISCLOSURE

According to some aspects, a modular valve assembly, or a method of configuring a modular valve assembly, advantageously reduces part number while increasing reconfiguration flexibility. Furthermore, by separating end connections from a center core, the number of needed center core patterns is reduced, which increases pattern flexibility and the possible custom configurations available.

In one exemplary arrangement, a modular valve assembly includes a bonnetless main core comprising a main core housing having a main core inlet and a main core outlet, a first releasable connection is disposed proximate the main core inlet and a second releasable connection is disposed proximate the main core outlet. A first inlet end connection includes a first inlet end connection housing and a first inlet end flow passage through the first inlet end connection housing. The first inlet end flow passage includes a curved portion that changes a direction of the first inlet end flow passage between 30 and 120 degrees. A second inlet end connection includes a second inlet end connection housing and a second inlet end flow passage through the second inlet end connection housing. The second inlet end connection passage is substantially straight, changing direction flow direction by less than 10 degrees. A first outlet end connection includes a first outlet end connection housing and a first outlet end flow passage through the first outlet end connection housing. The first outlet end flow passage includes an angled portion. A second outlet end connection passage includes a second outlet end connection housing and a second outlet end flow passage through the second outlet end connection housing. The second outlet end passage is substantially straight, changing fluid flow direction by less than 10 degrees. When the first inlet end connection is releasably connected to the first releasable connection and the first outlet end connection is releasably connected to the second releasable connection, the first inlet end connection, the bonnetless main core, and the first outlet end connection form an in-line valve configuration, where a flow direction at an inlet of the first inlet end connection and a flow direction at an outlet of the first outlet end connection change direction by less than 10 degrees. When the second inlet end connection is releasably connected to the first releasable connection and the second outlet end connection is releasably connected to the second releasable connection, the second inlet end connection, the bonnetless main core, and the second outlet and connection form an angled valve configuration, where a flow direction at an inlet of the second inlet end connection and a flow direction at an outlet of the second end connection change by more than 45 degrees.

In another exemplary arrangement, a method of configuring a modular valve assembly includes providing a bonnetless main core having a first releasable connection and a second releasable connection. A first inlet end connection includes a first inlet end flow passage having a curved portion that changes a direction of the first inlet end flow passage between 30 and 120 degrees. A second inlet end connection includes a second inlet end flow passage that is substantially straight, changing direction by less than 10 degrees. A first outlet end connection includes a first outlet end flow passage including an angled portion that changes direction of the first outlet end connection passage by between 30 and 120 degrees. A second outlet end connection passage includes a second outlet end flow passage that is substantially straight, changing direction by less than 10 degrees.

Either the first inlet end connection is releasably attached to the first releasable connection and the first outlet end connection is attached to the second releasable connection to form an in-line valve configuration; or the second inlet end connection is releasably attached to the first releasable connection and the second end connection is releasably attached to the second releasable connection to form an angled valve configuration.

In accordance with the teachings of the disclosure, any one or more of the foregoing aspects and/or exemplary aspects of a modular valve assembly may further include any one or more of the following optional forms.

In some optional forms, one of the first releasable connection or the second releasable connection comprises an external flange.

In other optional forms, one of the first inlet end connection or the second inlet end connection comprises an external flange.

In other optional forms, one of the first outlet end connection or the second outlet end connection comprises an external flange.

In other optional forms, one of the first releasable connection or the second releasable connection comprises a clamp.

In other optional forms, one of the first releasable connection or the second releasable connection comprises a sealing ring.

In other optional forms, the bonnetless main core comprises a stem opening.

In other optional forms, a valve trim is disposed in the bonnetless main core.

In other optional forms, the valve trim comprises a clamped cage.

In other optional forms, one end of the clamped cage includes an outer sealing flange that cooperates with the first releasable connection to secure the one end of the clamped cage in the bonnetless main core.

In other optional forms, an auxiliary core includes an auxiliary core housing having an auxiliary core inlet, a first auxiliary core outlet and a second auxiliary core outlet, the second auxiliary core outlet being releasably connected to the bonnetless main core inlet at the first releasable connection, thereby forming a 3-way valve configuration.

In other optional forms, a clamped cage extends from the bonnetless main core to the auxiliary core.

In other optional forms, the clamped cage comprises an external flange cooperates with the first releasable connection to secure the clamped cage in the bonnetless main core and in the auxiliary core.

In other optional forms, the bonnetless main core comprises a substantially flat mounting surface.

In other optional forms, a centralized data acquisition system is mounted to the substantially flat mounting surface.

In other optional forms, one of the first inlet end connection or the second inlet end connection is clamped to the first releasable connection.

In other optional forms, one of the first outlet end connection or the second outlet end connection is clamped to the second releasable connection.

In other optional forms, an auxiliary core is releasably attached to the first releasable connection to form a three-way valve configuration.

In other optional forms, the auxiliary core is clamped to the first releasable connection.

BRIEF DESCRIPTION OF THE DRAWINGS

Objects, features, and advantages of the present invention will become apparent upon reading the following description in conjunction with the drawing figures, in which.

DETAILED DESCRIPTION

Certain examples are shown in the above-identified figures and described in detail below. The figures are not necessarily to scale and certain features and certain views of the figures may be shown exaggerated in scale or in schematic for clarity and/or conciseness. Additionally, any features from any exemplary embodiment may be included with, a replacement for, or otherwise combined with other features to form other embodiments.

In the embodiments described below, any feature or structure described with respect to a single embodiment in a figure may be combined and arranged with any other embodiment illustrated in any other figure, or in any non-illustrated embodiments constructed in accordance with the teachings of the disclosure.

Figure 1:
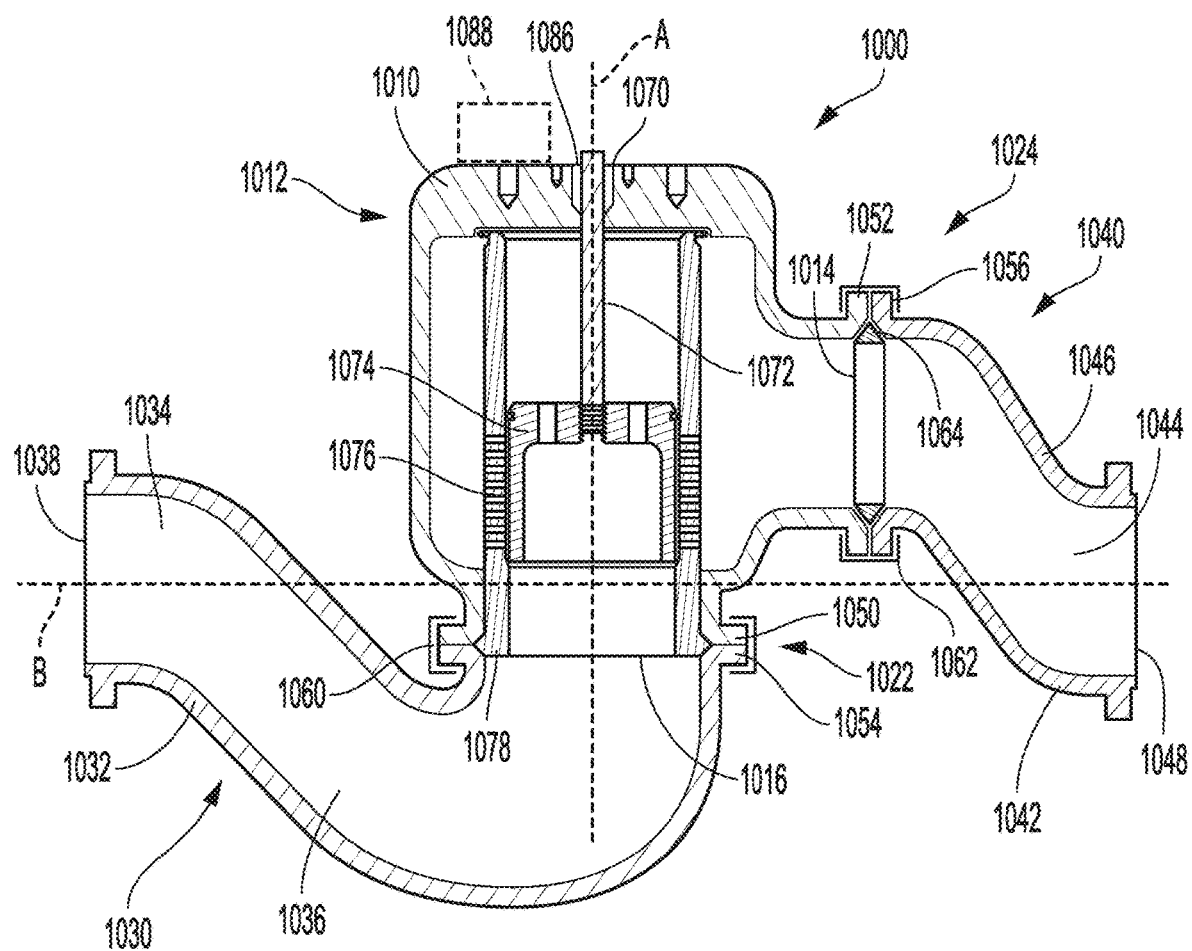
FIG. 1 is a cross-sectional view of a modular valve assembly including a bonnetless main core, a first inlet connector, and a first outlet connector, oriented in an in-line configuration.

Turning now to FIG. 1, a modular valve assembly 1000 includes a bonnetless main core 1010 comprising a main core housing 1012 having a main core inlet 1016 and a main core outlet 1014. In other embodiments, the main core inlet 1016 and the main core outlet 1014 may be reversed. A first releasable connection 1022 is disposed proximate the main core inlet 1016 and a second releasable connection 1024 is disposed proximate the main core outlet 1014.

A first inlet end connection 1030 is releasably attached to the first releasable connection 1022. The first inlet end connection 1030 comprises a first inlet end connection housing 1032 and a first inlet end flow passage 1034 through the first inlet end connection housing 1032. The first inlet end flow passage 1034 includes a curved portion 1036 that changes a direction of the first inlet end flow passage between 30 and 120 degrees as measured between a longitudinal axis A of the main core housing 1012, and a direction of flow B that enters the first inlet flow passage 1034. In the embodiment illustrated in FIG. 1, the flow passage changes direction by approximately 90 degrees.

A first outlet end connection 1040 comprising a first outlet end connection housing 1042 and a first outlet end flow passage 1044 through the first outlet end connection housing 1042. The first outlet end flow passage 1044 includes an angled portion 1046.

When the first inlet end connection 1030 is releasably attached to the first releasable connection 1022 and the first outlet end connection 1040 is releasably attached to the second releasable connection 1024, the first inlet end connection 1030, the bonnetless main core 1010 and the first outlet end connection 1040 form an in-line valve configuration. An in-line valve configuration is defined herein as a valve configuration where any change in flow direction measured between incoming flow at an inlet 1038 of the first inlet end connection and outlet flow at an outlet 1048 of the first outlet end connection is 10 degrees or less.

The first releasable connection 1022 includes an external flange 1050 and the second releasable connection 1024 also includes an external flange 1052. Similarly, the first inlet end connection 1030 includes an external flange 1054 and the first outlet end connection 1040 also includes an external flange 1056. The external flanges 1050, 1052, 1054, 1056, advantageously allow the first inlet end connection 1030 and the first outlet end connection 1040 to be held in a fluid tight releasable connection against the bonnetless main core 1010.

An inlet external clamp 1060 releasably secures the external flange 1054 of the first inlet end connection 1030 against the external flange 1050 of the first releasable connection 1022. Likewise, an outlet external clamp 1062 releasably secures the external flange 1056 of the first outlet end connection 1040 against the external flange 1052 of the second releasable connection 1024. An optional sealing ring 1064 may be clamped by the second releasable connection 1024 to enhance fluid sealing. While not illustrated in FIG. 1, a similar sealing ring may be located in the first releasable connection 1022.

The bonnetless main core 1010 includes a stem opening 1070. A stem 1072 may extend from an actuator (not shown) to a valve plug 1074. The valve plug 1074 is moved within the bonnetless main core 1010 to control fluid flow through the bonnetless main core 1010. A valve trim, such as a cage 1076 is also disposed in the bonnetless main core 1010 and cooperates with the valve plug 1074 to control the flow of fluid through the bonnetless main core 1010. In the embodiment of FIG. 1, the cage 1074 is a clamped cage that includes an outer sealing flange 1078 at one end of the cage 1074. The outer sealing flange 1078 is captured by the first releasable connection 1022 to secure the clamped cage 1076 in the bonnetless main core 1010.

Figure 2:
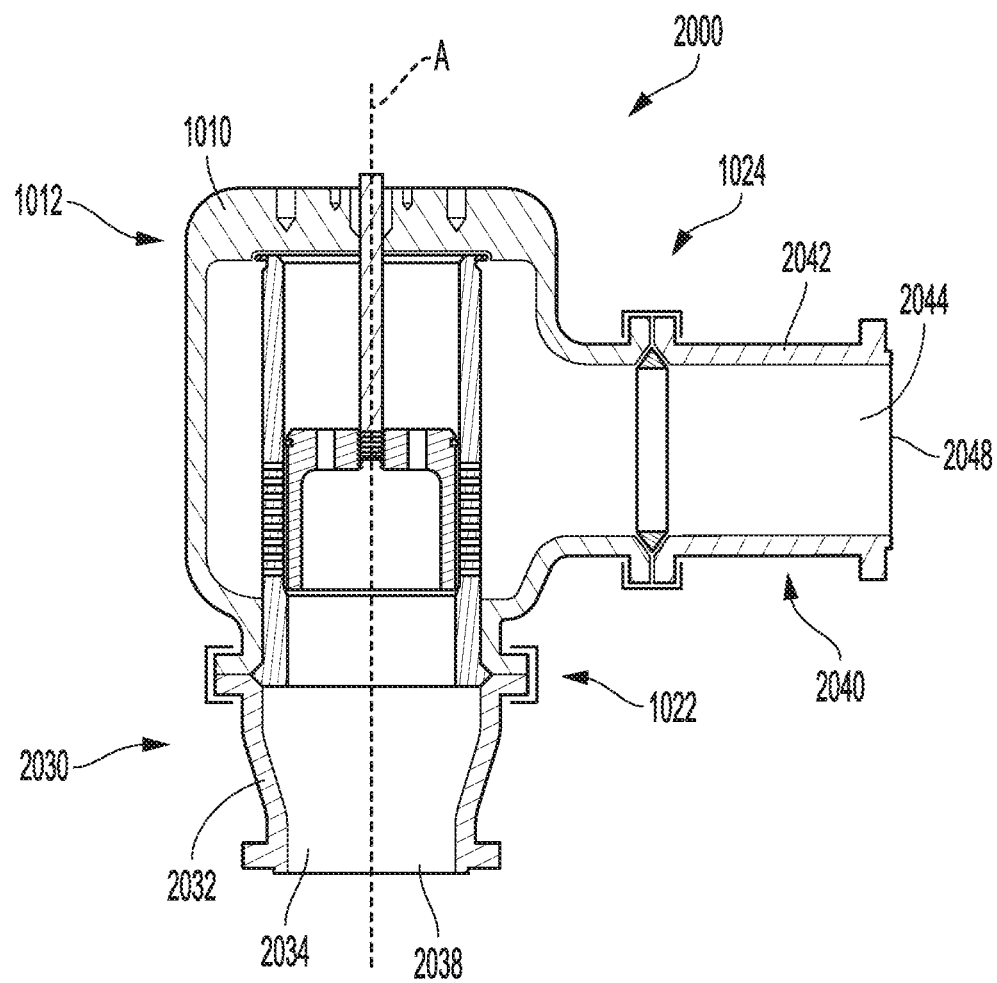
FIG. 2 is a cross-sectional view of a modular valve assembly including the bonnetless main core from FIG. 1, a second inlet connector, and a second outlet connector, oriented in an angled configuration.

Turning now to FIG. 2, a modular valve assembly 2000 includes the bonnetless main core 1010 of FIG. 1. Any features discussed above with respect to the bonnetless main core 1010 of FIG. 1 apply equally to the embodiment of FIG. 2 and are not discussed again for the sake of brevity.

A second inlet end connection 2030 is releasably attached to the first releasable connection 1022. The second inlet end connection 2030 comprises a second inlet end connection housing 2032 and a second inlet end flow passage 2034 through the second inlet end connection housing 2032. The second inlet end flow passage 2034 is substantially straight and aligned with the longitudinal axis A of the main core housing 1012. Substantially straight and aligned is defined as deviating 10 degrees or less from the longitudinal axis A.

A second outlet end connection 2040 is releasably attached to the second releasable connection 1024. The second outlet end connection 2040 comprises a second outlet end connection housing 2042 and a second outlet end flow passage 2044 through the second outlet end connection housing 2042. The second outlet end flow passage 2044 is substantially straight and perpendicular to the longitudinal axis A of the main core housing 1012. Substantially straight and perpendicular is defined as deviating less than 10 degrees along the second outlet end flow passage 2044 and being oriented between 80 degrees and 100 degrees relative to the longitudinal axis A.

When the second inlet end connection 2030 is releasably attached to the first releasable connection 1022 and the second outlet end connection 2040 is releasably attached to the second releasable connection 1024, the second inlet end connection 2030, the bonnetless main core 1010 and the second outlet end connection 2040 form an angled valve configuration. An angled valve configuration is defined herein as a valve configuration where any change in flow direction measured between incoming flow at an inlet 2038 of the second inlet end connection 2030 and outlet flow at an outlet 2048 of the second outlet end connection 2040 is 30 degrees or more, for example approximately 90 degrees as illustrated in FIG. 2.

By changing the first and second inlet end connections 1030, 2030 and the first and second outlet end connections 1040, 2040, the bonnetless main core 1010 may be rapidly reconfigured from an in-line valve to an angled valve. The disclosed modular valve assembly therefore produces multiple and flexible valve configurations with fewer parts that can be rapidly changed in the field to accommodate changing needs.

Figure 3:
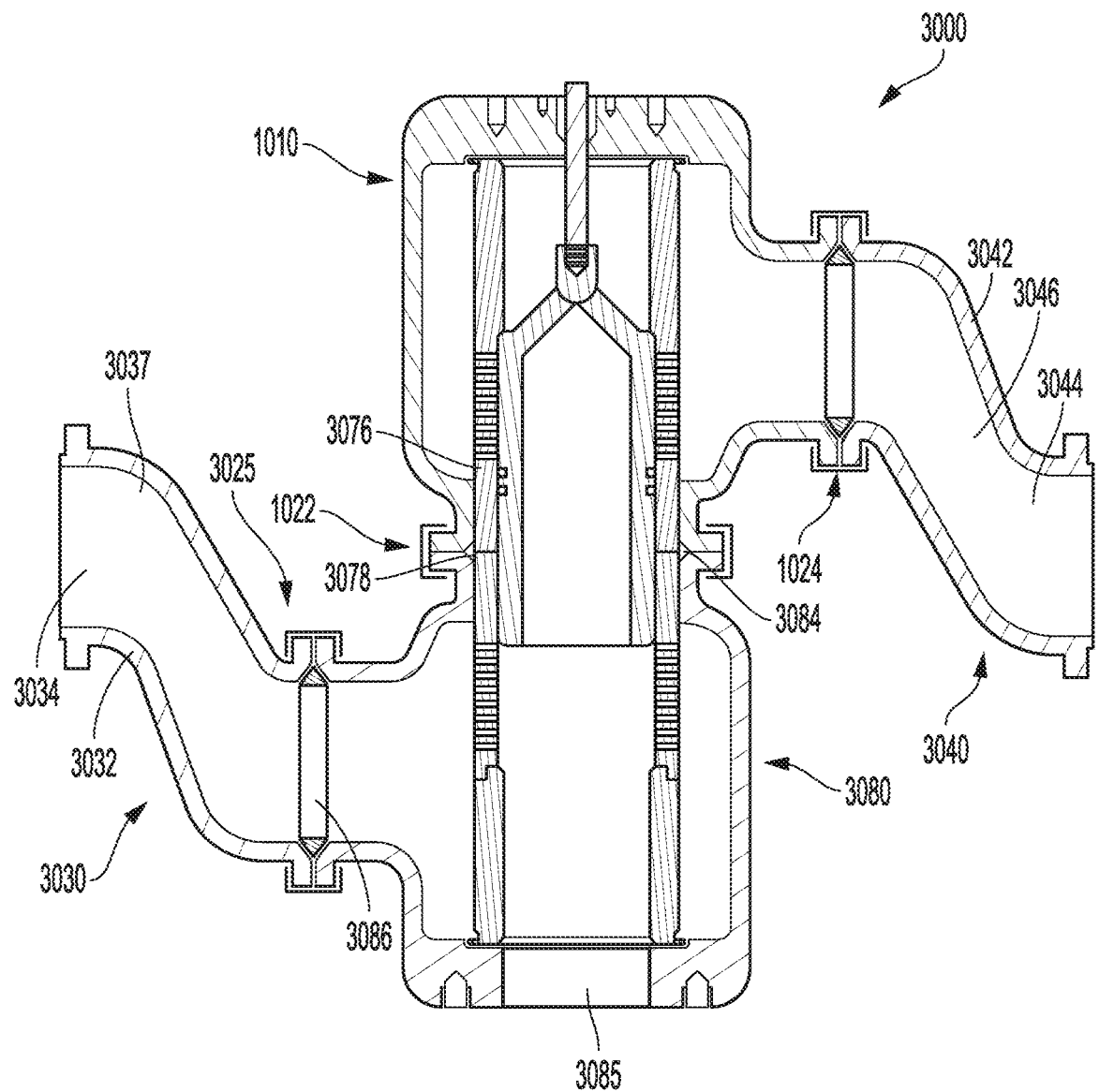
FIG. 3 is a cross-sectional view of a modular valve assembly including the bonnetless main core from FIG. 1, an auxiliary core, a third inlet connector, and a third outlet connector, oriented in a three-way configuration.

Turning now to FIG. 3, a modular valve assembly 3000 includes the bonnetless main core 1010 of FIG. 1. Any features discussed above with respect to the bonnetless main core 1010 of FIGS. 1 and 2 apply equally to the embodiment of FIG. 3 and are not discussed again for the sake of brevity.

In the embodiment of FIG. 3, an auxiliary core 3080 is removably attached to the first releasable connection 1022. The auxiliary core 3080 includes an auxiliary core inlet 3086, a first auxiliary core outlet 3084 and a second auxiliary core outlet 3085. The first auxiliary core outlet 3084 is located adjacent to the bonnetless core inlet 1016 proximate the first releasable connection 1022. The second auxiliary core outlet 3085 is located opposite the first auxiliary core outlet 3084. The auxiliary core 3080 also includes a third releasable connection 3025.

A third inlet end connection 3030 is releasably attached to the third releasable connection 3025. The third inlet end connection 3030 comprises a third inlet end connection housing 3032 and a third inlet end flow passage 3034 through the third inlet end connection housing 3032. The third inlet end flow passage 3034 includes an angled portion 3037.

A third outlet end connection 3040 is releasably attached to the second releasable connection 1024. The third outlet end connection 3040 comprises a third outlet end connection housing 3042 and a third outlet end flow passage 3044 through the third outlet end connection housing 3042. The third outlet end flow passage 3044 includes an angled portion 3046.

In other embodiments, the first, second, and third inlet connections 1030, 2030, 3030, may be substituted for one another to achieve a desired flow configuration. Similarly, the first, second, and third outlet connections 1040, 2040, 3040, may be substituted for one another to achieve a desired flow configuration.

When the auxiliary core 3080 is releasably connected to the bonnetless main core 1010, a three-way valve configuration is advantageously produced. In the embodiment of FIG. 3, a clamped cage 3076 extends through both the bonnetless main core 1010 and through the auxiliary core 3080. The clamped cage 3076 includes an external flange 3078 that is captured by the first connection 1022 to locate and secure the clamped cage 3076 within the bonnetless main core 1010 and within the auxiliary core 3080.

Referring now to FIGS. 1-3, any of the embodiments described above may be configured and reconfigured rapidly by changing or adding parts as described below. The bonnetless main core 1010 is the base element for all configurations. As described above, when the first inlet end connection 1030 is releasably connected to the first releasable connection 1022, and the first outlet end connection 1040 is releasably connected to the second releasable connection 1024, an in-line valve is produced as illustrated in FIG. 1.

To reconfigure the valve assembly into an angled valve assembly, the first inlet end connection 1030 and the first outlet end connection 1040 are removed from the first releasable connection 1022 and the second releasable connection 1024, respectively. Then, the second inlet end connection 2030 is releasably connected to the first releasable connection 1022 and the second outlet end connection 2040 is releasably connected to the second releasable connection 1024, and an angled valve assembly is formed, as illustrated in FIG. 2.

To reconfigure the modular valve assembly into a three-way valve, the second inlet connection 2030 is removed from the first releasable connection 1022 and the second outlet connection 2040 is removed from the second releasable connection 1024. The auxiliary core 3080 is releasably connected to the first releasable connection 1022. This alone forms a three-way valve, as illustrated in FIG. 3. However, one or more inlet and outlet end connections may be added to adapt the three-way valve to needed configurations.

Returning now to FIG. 1, the bonnetless main core 1010 may optionally include a substantially flat top mounting surface 1086. The substantially flat top mounting surface advantageously provides space and stability for mounting monitoring or control elements, such as a centralized data acquisition system 1088. Alternatively sensors, could be mounted on the substantially flat top mounting surface.

The modular valve assemblies described above may advantageously be quickly modified to include optional internal components, such as cavitation protection, orifice plates, flow straightening devices, etc. The bonnetless main core described above may also be combined with other end connections, such as varied size end connections, expanded outlet end connections, angle bodies, globe bodies, articulating joints.

The modular valve assembly described above may be advantageously configured or reconfigured into different types of valves, rapidly and in the field without special tools. In some examples, the modular valve assembly may be used to form high flow/low flow valves, as described below.

Figure 4:
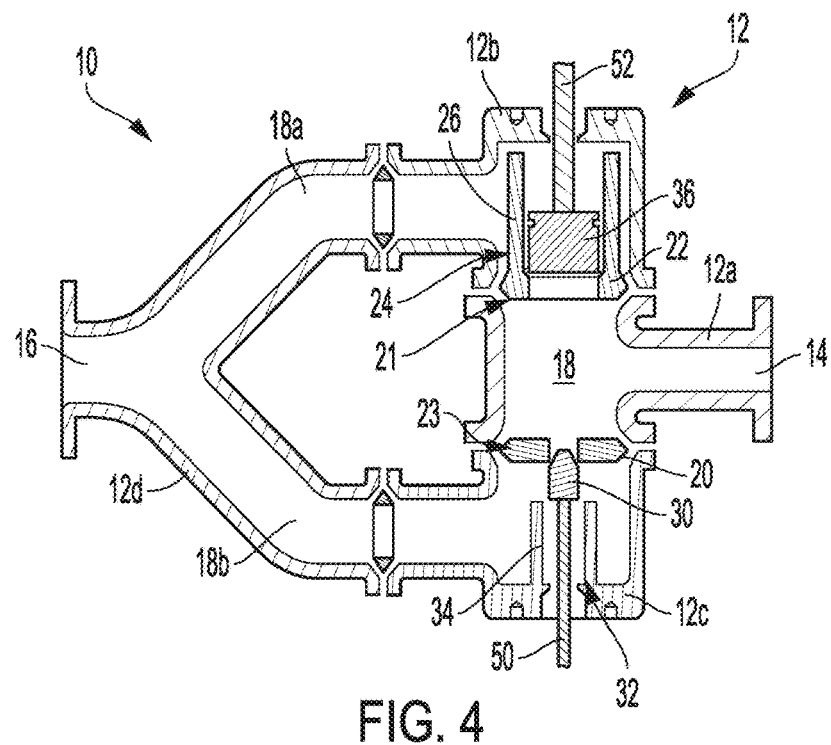
FIG. 4 is a cross-sectional view of a first embodiment high flow/low flow valve comprising a modular valve assembly.

Turning now to FIG. 4, a first embodiment of a high flow/low flow valve 10 is illustrated. The high flow/low flow valve 10 comprises a valve body 12, which may comprise multiple interchangeable segments 12a, 12b, 12c, 12d. The interchangeable segments 12a, 12b, 12c, 12d, may include outwardly curved flanges that cooperate with flanges on other segments to form a continuous valve body 12 when connected with one another, for example with brackets (not shown in FIG. 1). As a result, individual segments 12a, 12b, 12c, 12d, may be substituted or interchanged without the need for replacing the entire valve body 12.

The valve body 12 includes a fluid inlet 16 and a fluid outlet 14 connected to one another by a fluid passageway 18. In other embodiments, the fluid inlet and fluid outlet may be reversed. The fluid passageway 18 in the illustrated embodiment may include a first inlet branch 18a and a second inlet branch 18b.

A low flow valve seat 20 is disposed in a low flow port 23 of the fluid passageway 18. A high flow valve seat 22 is disposed in a high flow port 21 of the fluid passageway 18, and the high flow valve seat 22 is separated from the low flow valve seat 20 within the fluid passageway 18. In the illustrated embodiment of FIG. 4, the high flow valve seat 22 may be part of an integrated high flow trim assembly 24 that also includes a high flow clamped cage 26. In other embodiments, the high flow trim assembly 24 may include other types of cages, seat rings, plug guides, etc.

A low flow valve plug 30 is disposed in the fluid passageway 18 upstream of the low flow valve seat 20. The low flow valve plug 30 cooperates with the low flow valve seat 20 to control fluid flow through the low flow valve seat 20. A low flow trim assembly 32 may include, for example, the low flow valve seat 20 and a post guide 34. In other embodiments, other types of trim may be included in the low flow trim assembly 32. While the high flow trim assembly 24 and the low flow trim assembly 32 are illustrated in the current embodiments as being different structures, in some embodiments similar types of trim assembly structures may be employed between the high flow trim assembly 24 and the low flow trim assembly 32. For example, in some alternate embodiments, both the high flow trim assembly 24 and the low flow trim assembly 32 may comprise cages.

A high flow valve plug 36 is disposed in the fluid passageway 18 upstream of the high flow valve seat 22. The high flow valve plug 36 cooperates with the high flow valve seat 22 to control fluid flow through the high flow valve seat 22.

A low flow actuator 50 is operatively connected to the low flow valve plug 30, the low flow actuator 50 moving the low flow valve plug 30 relative to the low flow valve seat 20 to control fluid flow through the low flow valve seat 20. The low flow actuator 50 is configured to move the low flow plug 30 independently of the high flow valve plug 36.

Similarly, a high flow actuator 52 is operatively connected to the high flow valve plug 36, the high flow actuator 52 moving the high flow valve plug 36 relative to the high flow valve seat 22 to control fluid flow through the high flow valve seat 22. The high flow actuator 52 is configured to move the high flow valve plug 36 independently of the low flow valve plug 30.

The high flow/low flow valve 10 described above may be used to control a wide range of fluid flow conditions through the valve body 12. For example, when only a relatively low flow rate is needed, and/or one which requires precise control, the low flow valve plug 30 and the low flow valve seat 20 are ideally suited for fluid control. Initially, the high flow valve plug 36 is positioned relative to the high flow valve seat 22 at between 5% and 20% of the fully open high flow valve plug 36 travel. In some embodiments, the high flow valve plug 36 is positioned relative to the high flow valve seat 22 between 5% and 15%, and more particularly about 10%, of the full high flow valve plug 36 travel. Thereafter, the low flow valve plug 30 may be moved relative to the low flow valve seat 20 to precisely control low levels of fluid flow through the low flow valve seat 20. When downstream flow requirements require near maximum flow through the low flow valve seat 20, the low flow valve plug 30 may approach a fully open position to maximize fluid flow thorough the low flow valve seat 20. As the low flow valve plug 30 approaches fully open, the high flow valve plug 36 may be moved relative to the high flow valve seat 22 to increase overall fluid flow through the valve body 12 to greater than the maximum fluid flow through the low flow valve seat 20 alone. In other embodiments, the high flow valve plug 36 begins in a closed position (preventing fluid flow through the high flow valve seat 22) and the low flow valve plug 30 controls fluid flow until downstream requirements exceed the maximum flow rate through the low flow valve seat 20, at which point the low flow valve plug 30 is positioned fully open and the high flow valve plug 36 and the high flow valve seat 22 control fluid flow above the maximum low flow rate.

In the illustrated embodiment of FIG. 4, low flow valve seat 20 defines a low flow restriction (e.g., a maximum low flow port fluid flow) in the low flow port 23 and the high flow valve seat 22 defines a high flow restriction (e.g., a maximum high flow port fluid flow) in the high flow port 21, and the maximum low flow port fluid flow is between 5% and 25%, preferably between 10% and 20%, and more preferably about 15%, of the maximum high flow port fluid flow. The disclosed relative sizing between the maximum low flow port fluid flow and the maximum high flow port fluid flow advantageously produces a crossover band of fluid flow before the low flow port reaches 100% fluid flow and the high flow port begins opening to take over when the low flow port reaches its maximum fluid flow. This crossover band reduces chattering of the low flow valve plug 30 if a control signal cycles around the crossover band.

Figure 5:
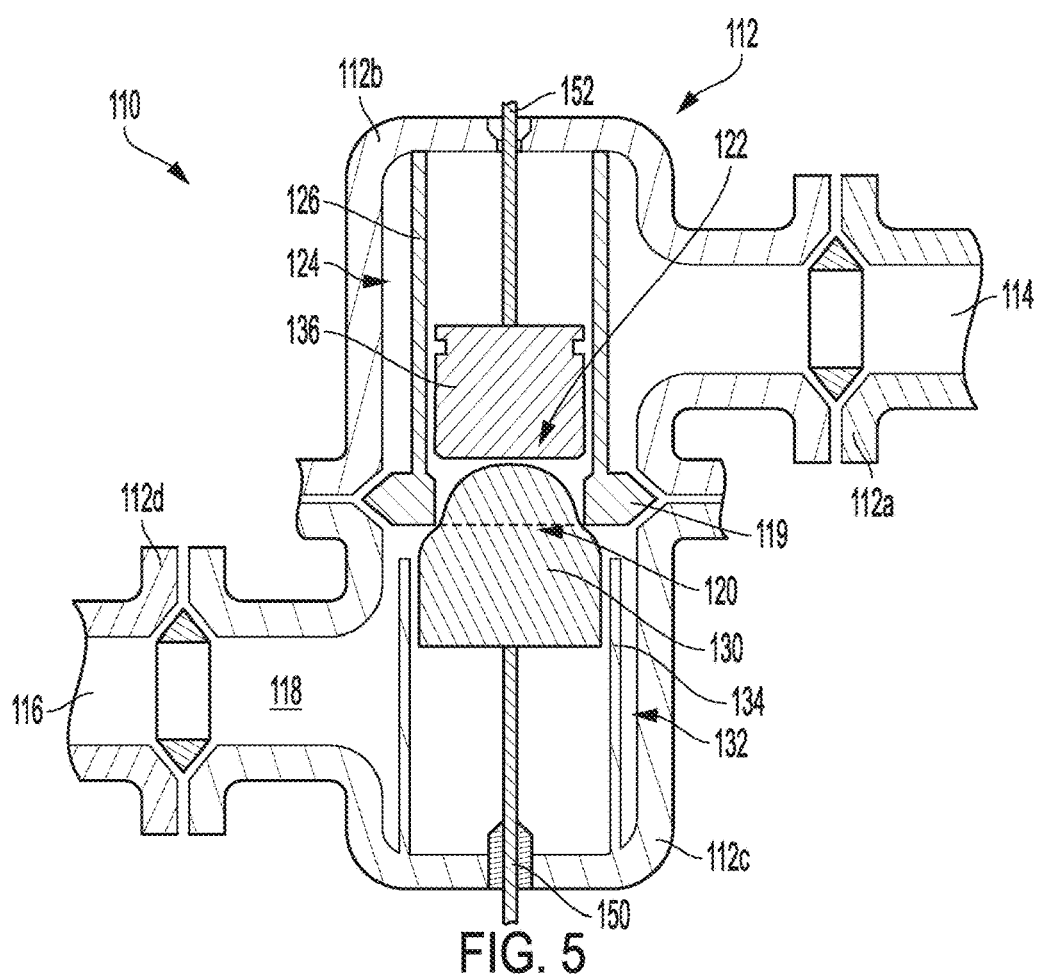
FIG. 5 is a cross-sectional view of a second embodiment of a high flow/low flow valve comprising a modular valve assembly.

Turning now to FIG. 5, a second embodiment of a high flow/low flow valve 110 is illustrated. Elements of the embodiment of FIG. 5 that correspond to identical elements in the embodiment of FIG. 4 are numbered exactly 100 greater that the embodiment of FIG. 4. For example, the valve body of FIG. 5 is numbered 112, while the valve body of FIG. 4 is numbered 12.

The high flow/low flow valve 110 illustrated in FIG. 5 includes a valve body 112 having a fluid inlet 114 and a fluid outlet 116 connected to one another by a fluid passageway 118. In other embodiments, the fluid inlet 114 and the fluid outlet 116 may be reversed. The valve body 112 may comprise multiple interchangeable segments 112a, 112b, 112c, 112d. The interchangeable segments 112a, 112b, 112c, 112d, may include outwardly curved flanges that cooperate with flanges on other segments to form a continuous valve body 112 when connected with one another, for example with brackets (not shown in FIG. 5). As a result, individual segments 112a, 112b, 112c, 112d, may be substituted or interchanged without the need for replacing the entire valve body 112. The valve body 112 includes a fluid inlet 114 and a fluid outlet 116 connected to one another by a fluid passageway 118.

A valve seat 119 is disposed in the fluid passageway 118. The valve seat 119 includes a high flow side 122 and a low flow side 120. In the illustrated embodiment of FIG. 5, the valve seat 119 may be part of an integrated high flow trim assembly 124 that also includes a high flow clamped cage 126. In other embodiments, the high flow trim assembly 124 may include other types of cages, seat rings, plug guides, etc.

A low flow valve plug 130 is disposed in the fluid passageway 118 downstream of the valve seat 120. The low flow valve plug 130 cooperates with the low flow side 120 of the valve seat 119 to control fluid flow through the valve seat 119. A low flow trim assembly 132 may include, for example, a post guide 134. In other embodiments, other types of trim may be included in the low flow trim assembly 132. While the high flow trim assembly 124 and the low flow trim assembly 132 are illustrated in the current embodiments as being different structures, in some embodiments similar types of trim assembly structures may be employed between the high flow trim assembly 124 and the low flow trim assembly 132. For example, in some alternate embodiments, both the high flow trim assembly 124 and the low flow trim assembly 132 may comprise cages.

A high flow valve plug 136 is disposed in the fluid passageway 118 upstream of the valve seat 119. The high flow valve plug 136 cooperates with the high flow side 122 of the valve seat 119 to control fluid flow through the valve seat 119.

A low flow actuator 150 is operatively connected to the low flow valve plug 130, the low flow actuator 150 moving the low flow valve plug 130 relative to the valve seat 119 to control fluid flow through the valve seat 119. The low flow actuator 150 is configured to move the low flow plug 130 independently of the high flow valve plug 136.

Similarly, a high flow actuator 152 is operatively connected to the high flow valve plug 136, the high flow actuator 152 moving the high flow valve plug 136 relative to the valve seat 119 to control fluid flow through the valve seat 119. The high flow actuator 152 is configured to move the high flow valve plug 136 independently of the low flow valve plug 130.

The high flow/low flow valve 110 described above with respect to FIG. 5, may be used to control a wide range of fluid flow conditions through the valve body 112. For example, when only a relatively low flow rate is needed, and/or one which requires precise control, the low flow valve plug 130 and the low flow side 120 of the valve seat 119 are ideally suited for fluid control. Initially, the high flow valve plug 136 is positioned away from the high flow side 122 of the valve seat 119 to a position that matches a crossover capacity of the low flow side 120, which in the illustrated embodiment is between 80% and 100% of the low flow valve plug 130 travel. This crossover capacity advantageously allows for a smooth transition between the low flow side 120 and the high flow side 122. Thereafter, the low flow valve plug 130 may be moved relative to the low flow side 120 of the valve seat 119 to precisely control low levels of fluid flow through the valve seat 119. When downstream flow requirements require more flow than the maximum flow controllable by the low flow valve plug 130, the low flow valve plug 130 approaches a fully open position to maximize fluid flow thorough the valve seat 119. Once the low flow valve plug 130 approaches the fully open position, the high flow valve plug 136 may be moved relative to the high flow side 122 of the valve seat 119 to increase overall fluid flow through the valve body 112 to greater than the maximum fluid flow controllable by the low flow valve plug 130 alone.

Figure 6:
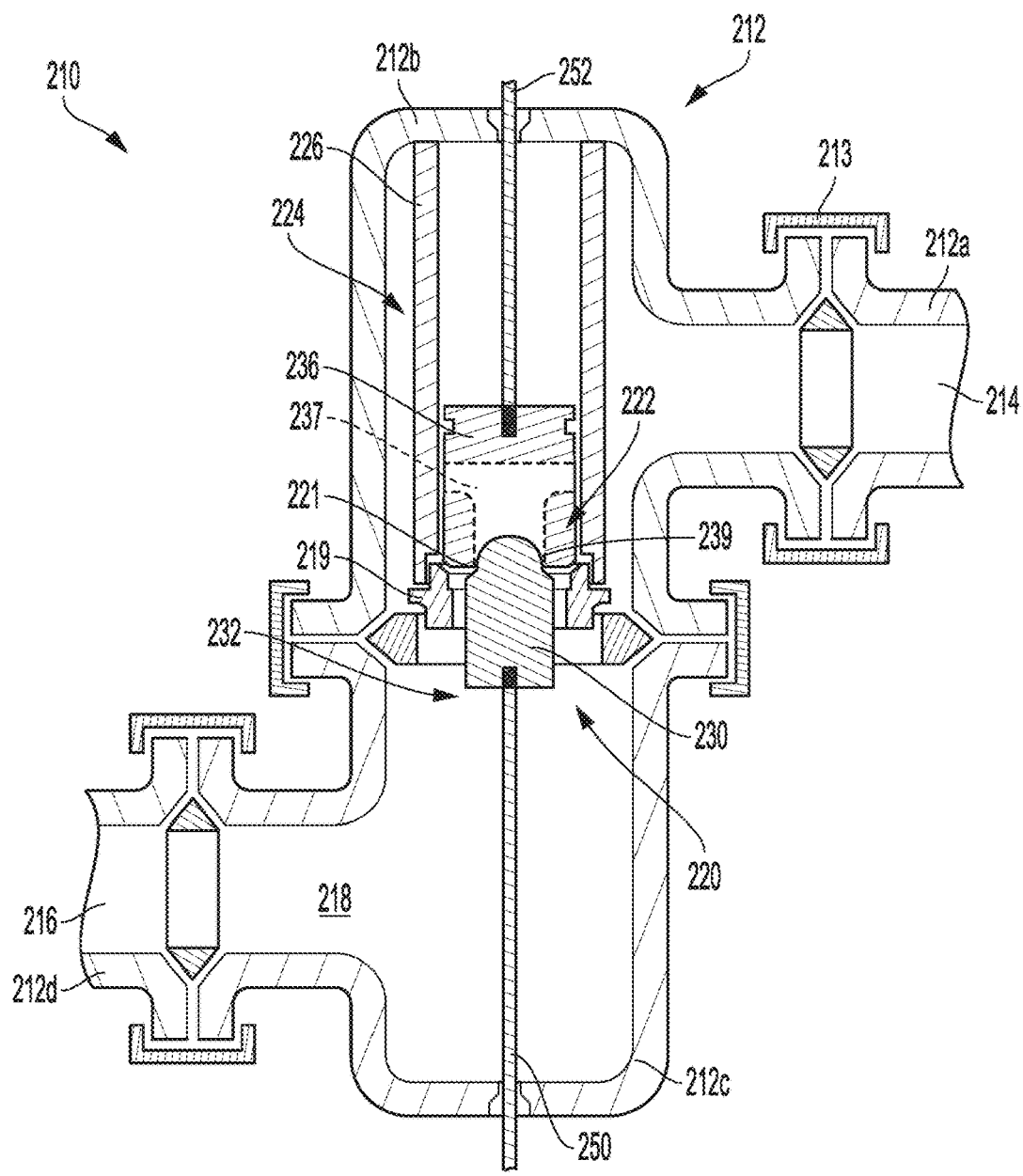
FIG. 6 is a cross-sectional view of a third embodiment of a high flow/low flow valve comprising a modular valve assembly.
Figure 7:
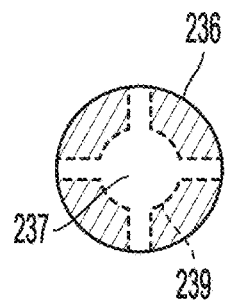
FIG. 7 is a cross-sectional view of a high flow valve plug of the high flow/low flow valve of FIG. 6.

Turning now to FIGS. 6 and 7, a third embodiment of a high flow/low flow valve 210 is illustrated. Elements of the embodiment of FIGS. 6 and 7 that correspond to identical elements in the embodiment of FIG. 4 or FIG. 5 are numbered exactly 100 or 200 greater that the embodiment of FIG. 4 or FIG. 5. For example, the valve body of FIG. 6 is numbered 212, while the valve body of FIG. 4 is numbered 12 and the valve body of FIG. 5 is numbered 112.

The high flow/low flow valve 210 comprises a valve body 212 having a fluid inlet 214 and a fluid outlet 216 connected to one another by a fluid passageway 218. In other embodiments, the fluid inlet 214 and the fluid outlet 216 may be reversed. The valve body 212 may comprise multiple interchangeable segments 212a, 212b, 212c, 212d. The interchangeable segments 212a, 212b, 212c, 212d, may include outwardly curved flanges that cooperate with flanges on other segments to form a continuous valve body 212 when connected with one another a mechanical joint retention mechanism, for example by clamps or brackets 213. As a result, individual segments 212a, 212b, 212c, 212d, may be substituted or interchanged without the need for replacing the entire valve body 212.

A valve seat 219 is disposed in the fluid passageway 218. The valve seat 219 includes a high flow side 222 and a low flow side 220. In the illustrated embodiment of FIG. 6, the valve seat 219 may be part of an integrated high flow trim assembly 224 that also includes a high flow clamped cage 226. In other embodiments, the high flow trim assembly 224 may include other types of cages, seat rings, plug guides, etc.

A high flow valve plug 236 is disposed in the fluid passageway 218 proximate valve seat 219. The high flow valve plug 236 cooperates with the high flow side 222 of the valve seat 219 to control fluid flow through the valve seat 219. The high flow valve plug 236 includes a hollow passageway 237 that forms part of the fluid passageway 218. An opening 239 of the hollow passageway 237 forms a low flow valve seat 221.

A low flow valve plug 230 is disposed in the fluid passageway 218 proximate the valve seat 219. The low flow valve plug 230 cooperates with the low flow valve seat 221 to control fluid flow through the hollow passageway 237. A low flow trim assembly 232 may include, for example, the low flow valve plug 230 and the low flow valve seat 221. In other embodiments, other types of trim may be included in the low flow trim assembly 232, such as plug guides, cages, etc. While the high flow trim assembly 224 and the low flow trim assembly 232 are illustrated in the current embodiment as being different structures, in some embodiments similar types of trim assembly structures may be employed between the high flow trim assembly 224 and the low flow trim assembly 232. For example, in some alternate embodiments, both the high flow trim assembly 224 and the low flow trim assembly 232 may comprise cages.

A low flow actuator 250 is operatively connected to the low flow valve plug 230, the low flow actuator 250 moving the low flow valve plug 230 relative to the low flow valve seat 239 to control fluid flow through the low flow valve seat 239. The low flow actuator 250 is configured to move the low flow plug 230 independently of the high flow valve plug 236.

Similarly, a high flow actuator 252 is operatively connected to the high flow valve plug 236, the high flow actuator 252 moving the high flow valve plug 236 relative to the valve seat 219 to control fluid flow through the valve seat 219. The high flow actuator 252 is configured to move the high flow valve plug 236 independently of the low flow valve plug 230.

The high flow/low flow valve 210 described above with respect to FIG. 6, may be used to control a wide range of fluid flow conditions through the valve body 212. For example, when only a relatively low flow rate is needed, and/or one which requires precise control, the low flow valve plug 230 and the low flow valve seat 221 are ideally suited for fluid control. Initially, the high flow valve plug 236 is positioned against the valve seat 219. Thereafter, the low flow valve plug 230 may be moved relative to the low flow valve seat 221 to precisely control low levels of fluid flow through the opening 239 and thus through the hollow passageway 237. When downstream flow requirements require more flow than the maximum flow controllable by the low flow valve plug 230, the low flow valve plug 230 may be positioned in a fully open position. Once the low flow valve plug 230 is fully open, the high flow valve plug 236 may be moved relative to the valve seat 219 to increase overall fluid flow through the valve body 212 to greater than the maximum fluid flow controllable by the low flow valve plug 230 alone.

Although certain high flow/low flow valves have been described herein in accordance with the teachings of the present disclosure, the scope of coverage of this patent is not limited thereto. On the contrary, while the invention has been shown and described in connection with various preferred embodiments, it is apparent that certain changes and modifications, in addition to those mentioned above, may be made. This patent covers all embodiments of the teachings of the disclosure that fairly fall within the scope of permissible equivalents. Accordingly, it is the intention to protect all variations and modifications that may occur to one of ordinary skill in the art.

The invention claimed is:

1. A modular valve assembly comprising:
a bonnetless main core comprising a main core housing having a main core inlet and a main core outlet, a first releasable connection proximate the main core inlet and a second releasable connection proximate the main core outlet;
a first inlet end connection comprising a first inlet end connection housing and a first inlet end flow passage through the first inlet end connection housing, the first inlet end flow passage including a curved portion that changes a direction of the first inlet end flow passage between 30 and 120 degrees;
a second inlet end connection comprising a second inlet end connection housing and a second inlet end flow passage through the second inlet end connection housing, the second inlet end flow passage being substantially straight, changing direction by less than 10 degrees;
a first outlet end connection comprising a first outlet end connection housing and a first outlet end flow passage through the first outlet end connection housing, the first outlet end flow passage including an angled portion;
a second outlet end connection comprising a second outlet end connection housing and a second outlet end flow passage through the second outlet end connection housing, the second outlet end passage being substantially straight, changing direction by less than 10 degrees,
wherein when the first inlet end connection is releasably connected to the first releasable connection and the first outlet end connection is releasably connected to the second releasable connection, the first inlet end connection, the bonnetless main core, and the first outlet end connection form an in-line valve configuration, where a flow direction at an inlet of the first inlet end connection and a flow direction at an outlet of the first outlet end connection change direction by less than 10 degrees, and
wherein when the second inlet end connection is releasably connected to the first releasable connection and the second outlet end connection is releasably connected to the second releasable connection, the second inlet end connection, the bonnetless main core, and the second outlet and connection form an angled valve configuration, wherein a flow direction at an inlet of the second inlet end connection and a flow direction at an outlet of the second end connection change by more than 45 degrees, and
further comprising an auxiliary core, the auxiliary core comprising an auxiliary core housing having an auxiliary core inlet, a first auxiliary core outlet and a second auxiliary core outlet, the second auxiliary core outlet being releasably connected to the bonnetless main core inlet at the first releasable connection, thereby forming a 3-way valve configuration.

2. The modular valve assembly of claim 1, wherein one of the first releasable connection or the second releasable connection comprises an external flange.

3. The modular valve assembly of claim 1, wherein one of the first inlet end connection or the second inlet end connection comprises an external flange.

4. The modular valve assembly of claim 1, wherein one of the first outlet end connection or the second outlet end connection comprises an external flange.

5. The modular valve assembly of claim 1, wherein one of the first releasable connection or the second releasable connection comprises a clamp.

6. The modular valve assembly of claim 1, wherein one of the first releasable connection or the second releasable connection comprises a sealing ring.

7. The modular valve assembly of claim 1, wherein the bonnetless main core comprises a stem opening.

8. The modular valve assembly of claim 1, further comprising a valve trim disposed in the bonnetless main core.

9. The modular valve assembly of claim 8, wherein the valve trim comprises a clamped cage.

10. The modular valve assembly of claim 9, wherein one end of the clamped cage includes an outer sealing flange that cooperates with the first releasable connection to secure the one end of the clamped cage in the bonnetless main core.

11. The modular valve assembly of claim 1, further comprising a clamped cage extending from the bonnetless main core to the auxiliary core.

12. The modular valve assembly of claim 11, wherein the clamped cage comprises an external flange cooperates with the first releasable connection to secure the clamped cage in the bonnetless main core and in the auxiliary core.

13. The modular valve assembly of claim 1, wherein the bonnetless main core comprises a substantially flat mounting surface.

14. The modular valve assembly of claim 13, further comprising a centralized data acquisition system mounted to the substantially flat mounting surface.

15. A method of configuring a modular valve assembly, the method comprising:
providing a bonnetless main core having a first releasable connection and a second releasable connection, a first inlet end connection comprising a first inlet end flow passage including a curved portion that changes a direction of the first inlet end flow passage between 30 and 120 degrees; a second inlet end connection comprising a second inlet end flow passage that is substantially straight, changing direction by less than 10 degrees; a first outlet end connection comprising a first outlet end flow passage including an angled portion that changes direction of the first outlet end connection passage by between 30 and 120 degrees; and a second outlet end connection passage comprising a second outlet end flow passage that is substantially straight, changing direction by less than 10 degrees, releasably attaching the first inlet end connection to the first releasable connection and attaching the first end connection to the second releasable connection to form an in-line valve configuration; or releasably attaching the second inlet end connection to the first releasable connection and attaching the second end connection to the second releasable connection to form an angled valve configuration; and further comprising providing an auxiliary core and releasably attaching the auxiliary core to the first releasable connection to form a three-way valve configuration.

16. The method of claim 15, further comprising clamping one of the first inlet end connection or the second inlet end connection to the first releasable connection.

17. The method of claim 15, further comprising clamping one of the first outlet end connection or the second outlet end connection to the second releasable connection.

18. The method of claim 15, further comprising clamping the auxiliary core to the first releasable connection.

* * * * *